(12) United States Patent
Tanaami et al.

(10) Patent No.: US 8,697,297 B2
(45) Date of Patent: *Apr. 15, 2014

(54) METAL-AIR BATTERY

(75) Inventors: Kiyoshi Tanaami, Saitama (JP); Yuji Isogai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/634,938

(22) PCT Filed: Mar. 16, 2011

(86) PCT No.: PCT/JP2011/056244
§ 371 (c)(1),
(2), (4) Date: Sep. 14, 2012

(87) PCT Pub. No.: WO2011/115176
PCT Pub. Date: Sep. 22, 2011

(65) Prior Publication Data
US 2013/0011754 A1  Jan. 10, 2013

(30) Foreign Application Priority Data
Mar. 16, 2010  (JP) .................................. 2010-058810

(51) Int. Cl.
*H01M 4/50* (2010.01)
(52) U.S. Cl.
USPC .......................................... 429/406; 429/405
(58) Field of Classification Search
None
See application file for complete search history.

(56) References Cited

U.S. PATENT DOCUMENTS

| | | | | |
|---|---|---|---|---|
| 2005/0238948 A1* | 10/2005 | Mei et al. | .......... | 429/40 |
| 2007/0054170 A1* | 3/2007 | Isenberg | .......... | 429/33 |
| 2008/0280165 A1* | 11/2008 | Kawamura | .......... | 429/13 |

FOREIGN PATENT DOCUMENTS

| | | | |
|---|---|---|---|
| JP | 2007307446 A | * | 11/2007 |
| JP | 2008-112724 A | | 5/2008 |
| JP | 2008-270166 A | | 11/2008 |
| JP | 2009-230985 A | | 10/2009 |
| JP | 2009-283381 A | | 12/2009 |
| JP | 2010-108622 A | | 5/2010 |
| JP | 2010-140821 A | | 6/2010 |
| WO | 2010/100752 A1 | | 9/2010 |
| WO | 2010/131536 A1 | | 11/2010 |

OTHER PUBLICATIONS

Larminie, James; Dicks, Andrew (2003). Fuel Cell Systems Explained (2nd Edition).. John Wiley & Sons. Online version available at: http://www.knovel.com/web/portal/browse/display?_EXT_KNOVEL_DISPLAY_bookid=1109&VerticalID=0.*
Machine Translation of JP 2007-307446.*
Machine Translation of JP 2008-112724.*

* cited by examiner

*Primary Examiner* — Milton I Cano
*Assistant Examiner* — Wojciech Haske
(74) *Attorney, Agent, or Firm* — Capitol City TechLaw, PLLC

(57) ABSTRACT

A metal air battery capable of obtaining larger charge-discharge capacity than before, is provided. The metal air battery 1 includes a negative electrode 2 including one metal selected from the group consisting of Li, Zn, Mg, Al, and Fe, a positive electrode 3 including a mixture of a carbon material and an oxygen-storing material, and an electrolyte interposed between the negative electrode and the positive electrode. The electrolyte is immersed in a separator 4. The negative electrode 2 includes metal Li. The oxygen-storing material includes a composite oxide of yttrium and manganese. The oxygen-storing material preferably has a hexagonal structure.

8 Claims, 8 Drawing Sheets

METAL-AIR BATTERY

TECHNICAL FIELD

The present invention relates o a metal air battery.

BACKGROUND ART

Conventionally, as a battery reaction, a metal air battery using an oxidation-reduction reaction of oxygen at a positive electrode is known. The metal air battery includes the one performing the oxidation-reduction reaction using oxygen taken in from air, and the one equipped with an oxygen-occluding material at the positive electrode, and the oxidation-reduction reaction is performed using oxygen released from the oxygen-occluding material.

In the metal air battery equipped with the oxygen-occluding material at the positive electrode, in the discharge time, a metal is oxidized to form metal ions at the negative electrode, and the metal ions migrate into the positive electrode side. On the other hand, at the positive electrode, oxygen released from the oxygen-occluding material is reduced to form oxygen ions, and form a metal oxide by bonding with the metal ions. Further, in the metal air battery, in the charge time, a reverse reaction of the above-mentioned reactions occurs in the negative electrode and the positive electrode.

As such metal air battery, there is known the one using manganese complex including oxygen as the oxygen-occluding material (for example, refer to Patent Literature 1), or the one using Fe-based metal composite oxide including perovskite-type structure (for example, refer to Patent Literature 2).

CITATION LIST

Patent Literature

Patent Literature 1: Japanese Patent Laid-Open No. 2009-230985
Patent Literature 2: Japanese Patent Laid-Open No. 2009-283381

SUMMARY OF INVENTION

Technical Problem

However, in the metal air battery equipped with the oxygen-occluding material at the positive electrode, there is an inconvenience that a reaction rate of the battery reaction is dominated by a diffusion speed of oxygen molecules and oxygen ions diffusing in the oxygen-occluding material. As a result, in the metal air battery equipped with the oxygen-occluding material at the positive electrode, the reaction rate of the battery reaction drops, and overpotential increases.

The present invention aims to resolve such inconvenience, and to provide a metal air battery capable of speeding up a reaction rate of the battery reaction, and suppressing increase of overpotential.

Solution to Problem

To attain the objects, the metal air battery of the present invention comprises: a negative electrode comprising one metal selected from the group consisting of Li, Zn, Mg, Al, and Fe; a positive electrode comprising a mixture of a carbon material and an oxygen-storing material which stores an oxygen-containing species; and an electrolyte interposed between the negative electrode and the positive electrode.

In the metal air battery of the present invention, it is preferable that the negative electrode comprises one metal selected from the group consisting of metal Li, Zn, and Fe, and more preferably Li. The metal air battery using metal Zn, metal Fe as the negative electrode may obtain high theoretical potential and a large electrochemical equivalent weight compared to the case where other metals are used, and the metal air battery using metal Li may obtain even higher theoretical potential and a larger electrochemical equivalent weight.

In the metal air battery of the present invention, in the discharge time, the metal is oxidized to form metal ions thereof at the negative electrode, and the generated metal ions migrate into the positive electrode side via the electrolysis. On the other hand, at the positive electrode, the oxygen-containing species stored in the mixture of the carbon material and the oxygen-storing material forms the metal compound by bonding with the metal ions. As a result, an electromotive force may be obtained. Further, in the charge time, a reverse reaction of the discharge time occurs.

In the metal air battery of the present invention, e oxygen-containing species acting when forming the metal compound by bonding with the metal ions may be the ones occluded in the oxygen-storing material, but the ones adsorbed to the surface of the mixture of the carbon material and the oxygen-storing material may be preferably acted. The oxygen-containing species merely adsorbed at the surface of the mixture of the carbon material and the oxygen-storing material is not necessary to be diffused within the oxygen-storing material.

Therefore, according to the metal air battery of the present invention, it becomes possible to speed up the reaction rate of the battery reaction, and as a result, it becomes possible to suppress increase of overpotential.

In the metal air battery of the present invention, the oxygen-containing species stored on the surface of the mixture comprises at least one molecule or anion selected from the group consisting of $O_2$, $O^{2-}$, $CO$, $CO_2$, $CO_3^{2-}$, and $CH_3COO^-$.

According to the oxygen-containing species, in the discharge time, oxides, carbonates, hydrogencarbonates, and acetates of the metal constituting the negative electrode may be formed at the positive electrode.

In the metal air battery of the present invention, it is preferable that the oxygen-storing material is a composite oxide of yttrium and manganese, or has a hexagonal structure. As a result, the oxygen-storing material may adsorb larger amount of the oxygen-containing species at the surface thereof As the oxygen-storing material, for example, a composite oxide represented by a chemical formula $YMnO_3$ may be listed, and preferably the composite oxide is a compound having a hexagonal structure.

Further, in the metal air battery of the present invention, it is preferable that the positive electrode comprises a mixture of the carbon material and the oxygen-storing material, and a binder. In the positive electrode, by binding the carbon material and the oxygen-storing material with the binder, the mixture may be formed easily.

Further, in the metal air battery of the present invention, it is preferable that the oxygen-storing material has an average particle diameter of 50 µm or less, is supported on the carbon material, and is equipped with a mass in the range of 10 to 90% by mass with respect to a total mass of the positive electrode.

In the case where the average particle diameter of the oxygen-storing material is greater than 50 µm, it is not possible to sufficiently adsorb the oxygen-containing species at the surface thereof, and there may be cases where the charge-discharge reaction cannot be sufficiently promoted. As such, there may be cases where the overpotential increases, and the capacity drops accompanied thereby.

Further, in the case where the mass of the oxygen-storing material is less than 10% by mass of the overall mass of the positive electrode, there may be cases where sufficient charge-discharge capacity may not be obtained in the metal air battery of the present invention. On the other hand, in the case where the mass of the oxygen-storing material exceeds 90% by mass of the overall mass of the positive electrode, the electron conductivity of the positive electrode drops, and there may be cases where sufficient charge-discharge capacity may not be obtained.

Further, in the metal air battery of the present invention, it is preferable that the mixture is equipped with a porosity in a range of 10 to 90% by volume, and more preferably a porosity in a range of 40 to 80% by volume.

In the case where the porosity of the mixture is less than 10% by volume, the oxygen does not sufficiently diffuse, so that there may be cases where the precipitation of the metal compound generated at the positive electrode in the discharge time is inhibited. Further, in the case where the porosity of the mixture exceeds 90% by volume, there may be cases where the reaction between ions of the metal of the negative electrode such as Li ion on the catalyst and oxygen does not sufficiently progress. Further, in the case where the porosity of the mixture exceeds 90% by volume, mechanical strength thereof drops, and there may be cases where the cycle characteristics deteriorate.

Description Of Embodiment

Next, embodiments of the present invention will be explained in more detail with reference to the accompanying drawings.

Figure 1:
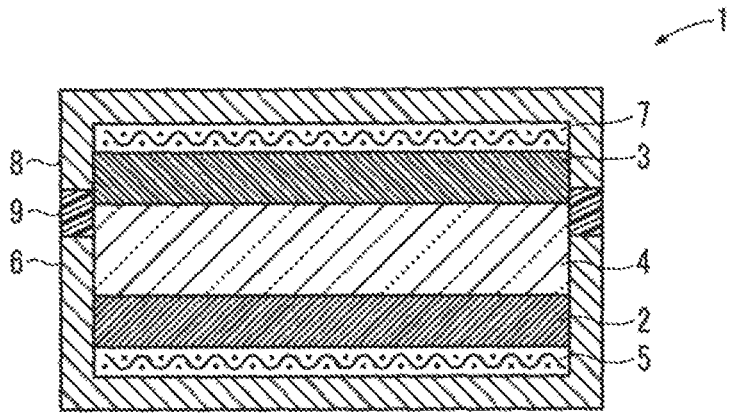
[FIG. 1] An explanatory cross-sectional view showing a configuration example of a first aspect of a metal air battery of the present invention.

As is shown in FIG. 1, a metal air battery 1 of the present embodiment is cylindrical, and is equipped with a negative electrode 2, a positive electrode 3, and a separator 4 provided between the negative electrode 2 and the positive electrode 3. The separator 4 is immersed with electrolyte.

The negative electrode 2 is comprised of one metal selected from a group consisting of Li, Zn, Mg, Al, and Fe, and preferably one metal selected from a group consisting of Li, Fe, and Zn. The negative electrode 2 is more preferably comprised of metal lithium. The negative electrode 2 is accommodated in a negative electrode container 6 made of stainless steel, via a negative electrode current collector 5 comprised of stainless steel, Ni mesh and the like.

The positive electrode 3 is a porous body comprised of a mixture of a carbon material, an oxygen-storing material, and a binder, is press bonded to a positive electrode current collector 7 comprised of Al mesh, Ni porous body and the like, and is accommodated in a positive electrode container 8 made of stainless steel, via the positive electrode current collector 7. The negative electrode container 6 and the positive electrode container 8 are electrically insulated by an insulating resin member 9 provided around the separator 4.

The separator 4 is comprised of, for example, polypropylene membrane, glass papers, and the like. Further, as the electrolyte, a solution in which lithium hexafluorophosphate ($LiPF_6$) as a supporting salt is dissolved in a mixed solution of ethylene carbonate and diethyl carbonate, may be used. The electrolyte is immersed in the separator 4.

The carbon material acts as a conductive material, and also as a support of the oxygen-storing material in the positive electrode 3. As such carbon material, for example Ketjen Black (made by Lion Corp.) may be used.

As the oxygen-storing material, for example, a composite oxide of yttrium and manganese represented by a chemical formula $YMnO_3$, and which has a hexagonal structure, may be used. Further, it is preferable that the oxygen-storing material is equipped with a mass in the range of 10 to 90% by mass of the total mass of positive electrode.

The composite oxide may be manufactured, for example, by adding an organic acid to a mixture of yttrium salt and manganese salt, reacting the same under heating for a. predetermined time, crushing and mixing the reaction product, and calcining the same. As yttrium salt, nitrate salt or acetate salt of yttrium may be used, and as manganese salt, nitrate salt or acetate salt of manganese may be used. Further, as the organic acid, for example, malic acid and the like may be used. The composite oxide manufactured as above preferably has an average particle diameter of 50 μm or smaller.

The binder makes the mixed state of the carbon material and the oxygen-storing material in the positive electrode 3 well. As such binder, for example, a polytetrafluoroethylene (MT) and the like may be used.

Further, the mixture comprising the carbon material, the oxygen-storing material, and the binder is equipped with a porosity preferably in the range of 10 to 90% by volume, more preferably in the range of 40 to 80% by volume. The mixture may adjust the porosity by the pressure during press bonding to the positive electrode current collector 7.

In the metal air battery 1 of the present embodiment equipped with the above-mentioned configuration, when metal ions generated at the negative electrode 2 by the metal being oxidized generates metal compound at the positive electrode 3, the oxygen-containing species stored in the mixture is used. At this time, the mixture occludes the oxygen-containing species in the oxygen-storing material, and at the same time adsorbs and holds the oxygen-containing species at the surface of the mixture.

The oxygen-containing species merely adsorbed at the surface of the mixture of the carbon material and the oxygen-storing material is, unlike those stored in the oxygen-storing material, not necessary to be diffused within the oxygen-storing material, and the binding energy with the mixture is low.

As a result, according to the metal air battery 1 of the present embodiment, when the metal ion generates the metal compound in the positive electrode 3, it becomes possible to preferably act the oxygen-containing species adsorbed to the surface of the carbon material and the oxygen-storing material.

As a result, according to the metal air battery 1, the reaction rate of the battery reaction is speeded up so as to suppress the rise of overpotential, it becomes possible to obtain larger charge-discharge capacity compared to the conventional metal air batteries.

Figure 2:
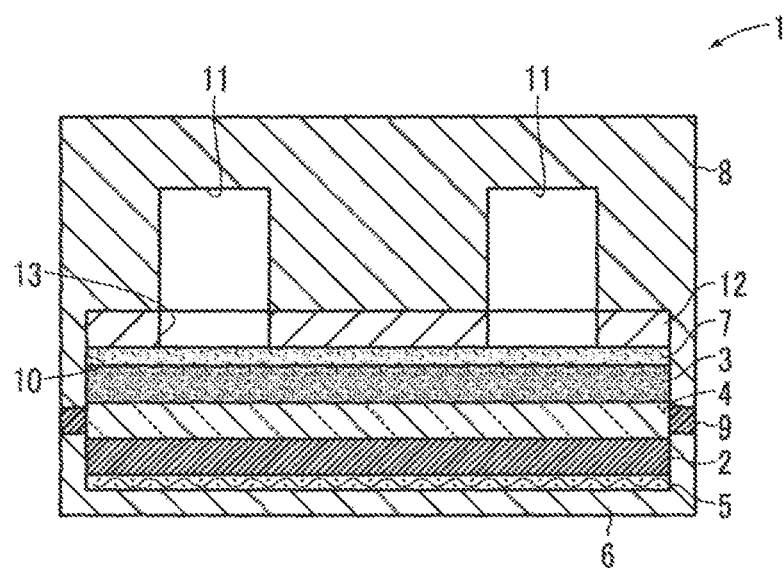
[FIG. 2] An explanatory cross-sectional view showing a configuration example of a second aspect of the metal air battery of the present invention.

Further, as is shown in FIG. 2, the metal air battery 1 of the present embodiment may be configured that the positive electrode container 8 is equipped with a hole 10 accommodating the positive electrode 3 and a supporting member, and cylindrical air pools 11 communicating with the hole 10. At this time, the positive electrode container 8 is equipped with a pressure member 12 at a bottom portion made of stainless steel which presses the positive electrode 3 and the positive electrode current collector 7 to the separator 4, and the pressure member 12 is equipped with through-holes 13 communicating with the hole 10 and the air pools 11.

Even in the case where the air pools 11 shown in FIG. 2 is provided, the metal air battery 1 of the present invention is capable of obtaining larger charge-discharge capacity compared to the conventional metal air batteries, similarly to the configuration shown in FIG. 1.

Next, Examples and Comparative Examples are shown.

EXAMPLES

Example 1

In the present Example, a metal air battery 1 equipped with a configuration shown in FIG. 1 was formed as is explained below.

First, a composite oxide represented by the chemical formula $YMnO_3$ was prepared as an oxygen-storing material. First, yttrium nitrate pentahydrate, manganese nitrate hexahydrate, and malic acid in a molar ratio of 1:1:6 were crushed and mixed to thereby prepare the composite oxide. Then, the obtained mixture was reacted at a temperature of 250° C. for 30 min, and thereafter further reacted at a temperature of 300° C. for 30 min and at a temperature of 50° C. for 1 hour. Then, the mixture of the reaction product was crushed and mixed, and thereafter calcined at a temperature of 1,000° C. for 1 hour to thereby obtain a composite oxide.

Figure 3:
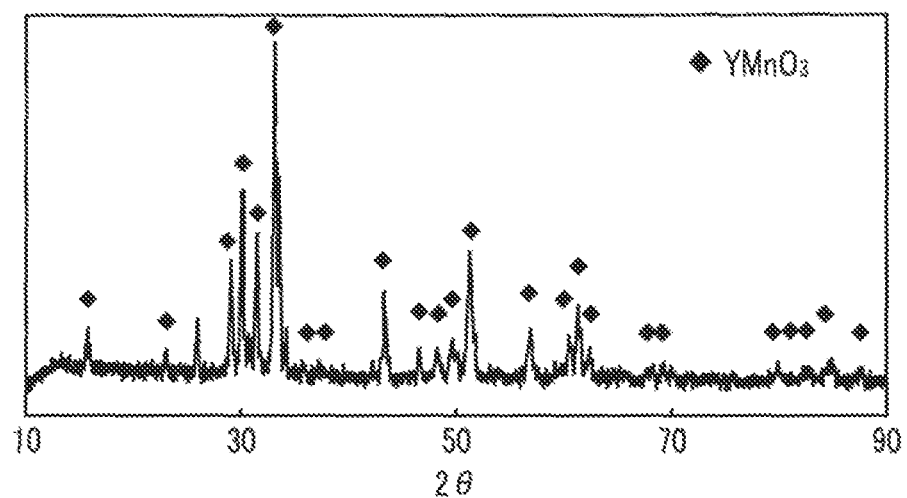
[FIG. 3] A graph showing a result of an X-ray diffractometry measurement of an oxygen-storing material used in the metal air battery of the present invention.

Next, an X-ray diffractometry pattern of the obtained composite oxide was measured. The measurement was performed by using an X-ray diffractometer (made by Balker AXS K. K.), at a tube voltage of 50 kV, a tube current of 150 mA, a diffractometer of 4°/min, and a measurement range (2θ) in a range of 10-90°. The result is shown in FIG. 3. From FIG. 3, the composite oxide obtained in the present Example was confirmed to be the composite oxide represented by the chemical formula $YMnO_3$, and have a hexagonal structure.

Figure 4:
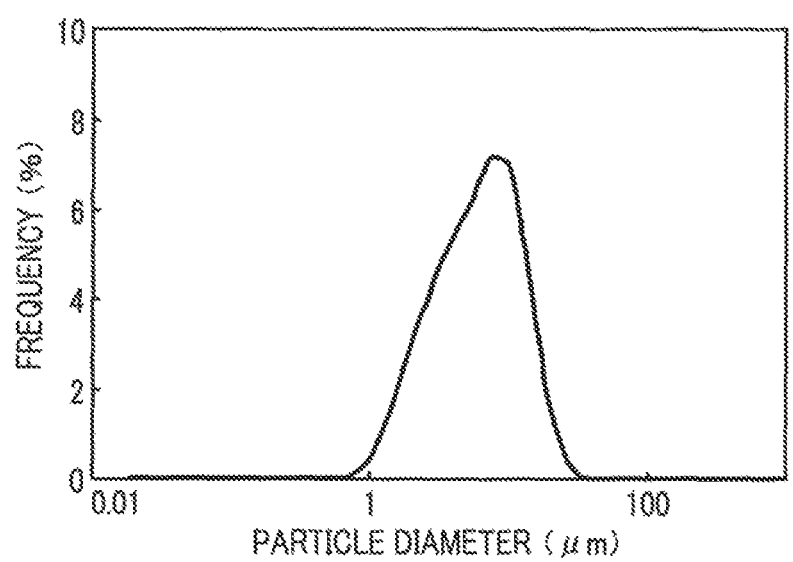
[FIG. 4] A graph showing distribution of particle diameter of the oxygen-storing material used in the metal air battery of the present invention.

Next, a particle size distribution of the composite oxide obtained in the present invention was measured. The measurement was performed by using a laser diffraction/scattering type particle size distribution measuring apparatus (made by HORIBA Ltd.) and using ethanol as a solvent, and the average particle diameter D50 was calculated. The result is shown in FIG. 4. From FIG. 4, it was revealed that the obtained composite oxide had an average particle diameter of 5.75 μm.

Next, 0.1 g of the composite oxide obtained in the present Example was accommodated in a sample tube made of quartz, and the sample tube was installed inside a tubular furnace. Ar gas containing 3% by volume of $H_2$ was introduced into the sample tube at a flow rate of 100 ml/min from the entrance side of the sample tube. $H_2$ gas concentration was measured at the exit side of the sample tube, and was held until the $H_2$ gas concentration became constant.

Next, while introducing Ar gas including $H_2$ to the sample tube, the tubular furnace was heated to 600° C. at the rate of 0° C./min, $H_2O$ concentration in the gas discharged from the exit side of the sample tube during heating was measured, and a quantity of an adsorbed oxygen amount of the composite oxide was determined from the measured $H_2O$ concentration.

Figure 5:
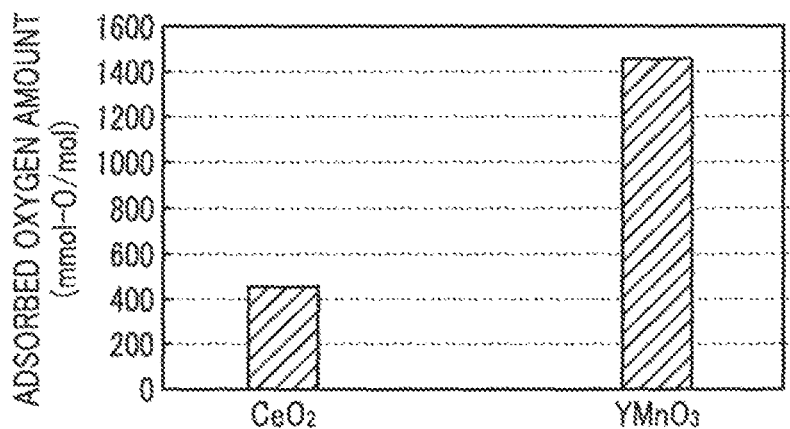
[FIG. 5] A graph showing comparison of adsorbed oxygen amount of the oxygen-storing material used in the metal air battery of the present invention and $CeO_2$.

Next, the quantity of the adsorbed oxygen mount of $CeO_2$ was measured Wholly the same as in the case of the composite oxide obtained in the present Example, except for using $CeO_2$ in place of the composite oxide obtained in the present Example, The results are shown in FIG. 5.

From FIG. 5, it is apparent that the adsorbed oxygen amount of the composite oxide obtained in the present Example is more than three times that of $CeO_2$, and that the composite oxide obtained in the present Example is equipped with a superior oxygen adsorption capacity.

Then, 40 parts by mass of the composite oxide obtained in the present Example, 50 parts by mass of Ketjen Black (made by Lion Corp.), and 10 parts by mass of a PTFE (made by Daikin industries, Ltd.) as a binder were mixed to thereby obtain a positive electrode mixture. Then, the obtained positive electrode mixture was press bonded at a pressure of 5 MPa on a positive electrode current collector 7 composed of an Al mesh of 15 mm in diameter to thereby form a positive electrode 3 of 15 mm in diameter and 1 mm in thickness.

Figure 6:
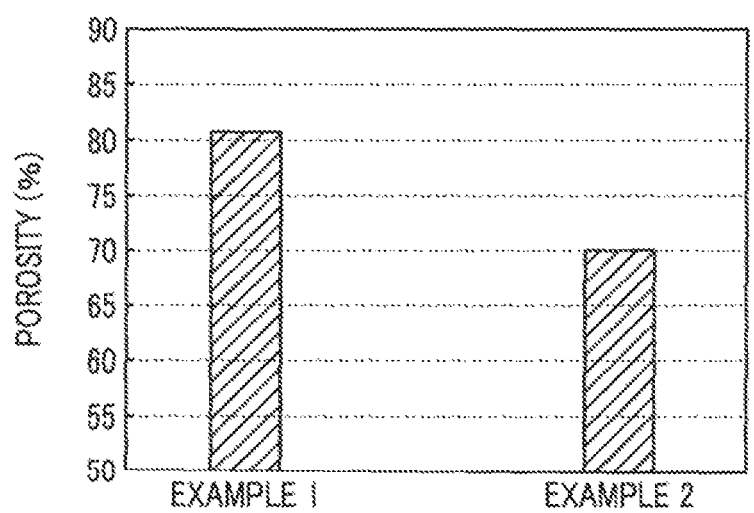
[FIG. 6] A graph showing a porosity of a positive electrode mixture used in the metal air battery of the first aspect of the present invention.

The positive electrode 3 obtained in the present Example was confirmed to have a porosity of 80% by volume by a mercury intrusion method. The result is shown in FIG. 6.

Then, via a negative electrode current collector 5 of 15 mm in diameter composed of a stainless steel, a negative electrode 2 of 15 mm in diameter and 1 mm in thickness composed of metallic Li was arranged inside a bottomed cylindrical stainless steel-made negative electrode container 6 of 15 mm in inner diameter, Then, a separator 4 of 15 mm in diameter composed of a polypropylene membrane (made by Tapyrus Co., Ltd.) was placed on the negative electrode 2. Then, the positive electrode 3 and the positive electrode current collector 7 were placed on the separator 4 so that the positive electrode 3 contacted with the separator 4.

Then, an electrolyte was injected into the separator 4. The electrolyte was a solution (made by Kishida Chemical Co., Ltd.) in which lithium hexafluorophosphate ($LiPF_6$) as a supporting salt was dissolved in a concentration of 1 mol/L in a solvent which was a mixed solution prepared by mixing 30 parts by mass of ethylene carbonate and 70 parts by mass of diethyl carbonate.

Then, the positive electrode 3 and the positive electrode current collector 7 were closed by a positive electrode container 8 to thereby obtain a metal air battery 1 shown in FIG. 1. In the metal air battery 1, the positive electrode container 8 and the negative electrode container 6 are electrically insulated by an insulating resin member 9 arranged around the separator 4. The insulating resin member 9 is a ring shape of 32 mm in outer diameter, 30 mm in inner diameter and 5 mm in thickness composed of a PTFE.

Figure 7:
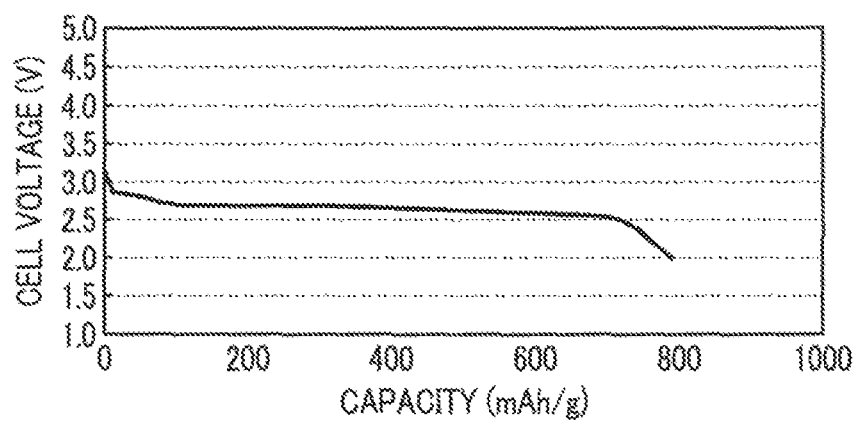
[FIG. 7] A graph showing a discharge capacity and a charge capacity of the metal air battery of Example 1 of the present invention.
Figure 7:
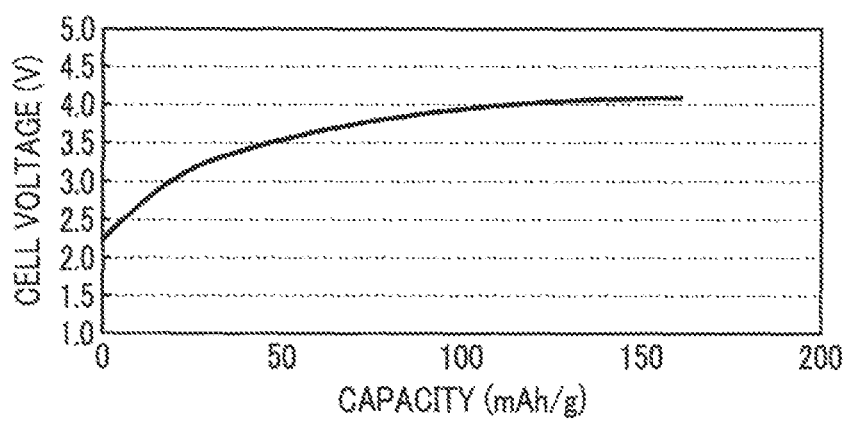

Then, the metal air battery 1 obtained in the present Example was loaded on an electrochemical measuring apparatus (made by Toho Technical Research Co., Ltd.); and a current of 0.1 mA/cm$^2$ was applied between the negative electrode 2 and the positive electrode 3, and the discharge was carried out until the cell voltage became 2.0 V. The relationship between the cell voltage and the capacity is shown in FIG. 7(a).

Then, the metal air battery 1 obtained in the present Example was loaded on the electrochemical measuring apparatus (Made by Toho Technical Research Co., Ltd.); and a current of 0.1 mA/cm$^2$ was applied between the negative electrode 2 and the positive electrode 3, and the charge was carried out until the cell voltage became 4.1 V. The relationship between the cell voltage and the capacity is shown in FIG. 7(b).

Example 2

In the present Example, first, the composite oxide represented by the chemical formula $YMnO_1$ was prepared as the oxygen-storing material wholly the same as in Example 1. It was confirmed that the composite oxide obtained in the present Example was the composite oxide represented by the chemical formula $YMnO_3$, and have a hexagonal structure.

Then, 80 parts by mass of the composite oxide obtained in the present Example, 10 parts by mass of Ketjen Black (made by Lion Corp.), and 10 parts by mass of a PTFE (made by Daikin Industries, Ltd.) as a binder were mixed to thereby obtain a positive electrode mixture. Then, the obtained positive electrode mixture was press bonded at a pressure of 5 MPa on a positive electrode current collector 7 composed of an Al mesh of 15 mm in diameter to thereby form a positive electrode 3 of 15 mm in diameter and 1 mm in thickness.

The positive electrode 3 obtained in the present Example was confirmed to have a porosity of 70% by volume by a mercury intrusion method. The result is shown in FIG. 6.

Then, the metal air battery 1 equipped with the configuration of FIG. 1 was obtained wholly the same as in Example 1 except for using the positive electrode 3 obtained in the present Example.

Figure 8:
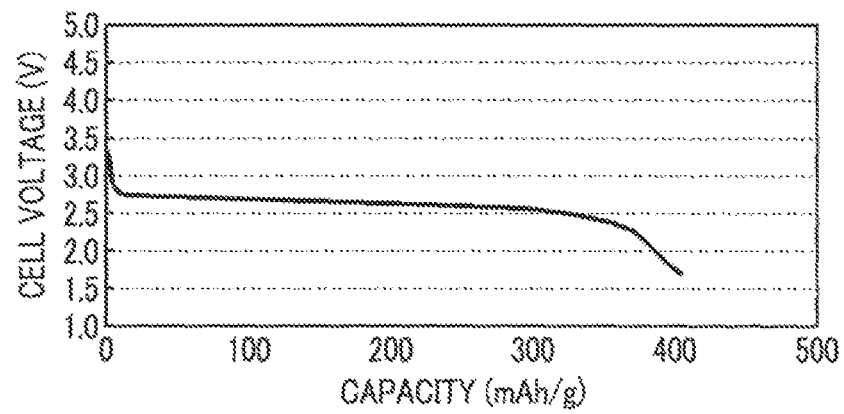
[FIG. 8] A graph showing the discharge capacity and the charge capacity of the metal air battery of Example 2 of the present invention.
Figure 8:
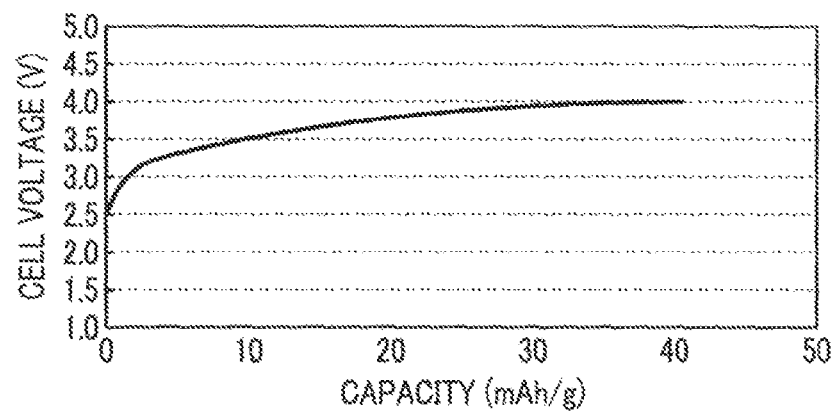

Then, the metal air battery 1 obtained in the present Example was loaded on an electrochemical measuring apparatus (made by Toho Technical Research Co., Ltd.); and a current of 0.1 mA/cm$^2$ was applied between the negative electrode 2 and the positive electrode 3, and the discharge was carried out until the cell voltage became 2.0 V. The relationship between the cell voltage and the capacity is shown in FIG. 8(a).

Then, the metal air battery 1 obtained in the present Example was loaded on the electrochemical measuring apparatus (made by Toho Technical Research Co. Ltd.); and a current of 0.1 mA/cm$^2$ was applied between the negative electrode 2 and the positive electrode 3, and the charge was carried out until the cell voltage became 4.0 V. The relationship between the cell voltage and the capacity is shown in FIG. 8(b).

Example 3

In the present Example, the metal air battery 1 equipped with the configuration of FIG. 1 was obtained wholly the same as in Example 1, except for using a metal iron of 15 mm in diameter and 0.5 mm in thickness as the negative electrode 2, and a KOH aqueous solution of 6 mol/L as the electrolyte.

Figure 9:
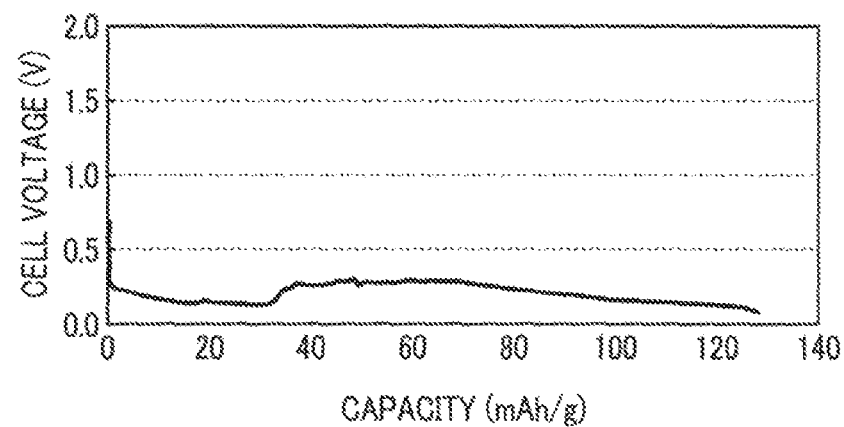
[FIG. 9] A graph showing the discharge capacity of the metal air battery of Example 3 of the present invention.

Next, the metal air battery 1 obtained in the present Example was loaded on an electrochemical measuring apparatus (made by Toho Technical Research Co., Ltd.); and a current of 0.1 mA/cm$^2$ was applied between the negative electrode 2 and the positive electrode 3, and the discharge was carried out until the cell voltage became 0.1 V. The relationship between the cell voltage and the capacity is shown in FIG. 9.

Example 4

In the present Example, the metal air battery 1 equipped with the configuration of FIG. 1 was obtained wholly the same as in Example 1, except for using a metal zinc of 15 mm in diameter and 0.5 mm in thickness as the negative electrode 2, and a KOH aqueous solution of 6 mol/L as the electrolyte.

Figure 10:
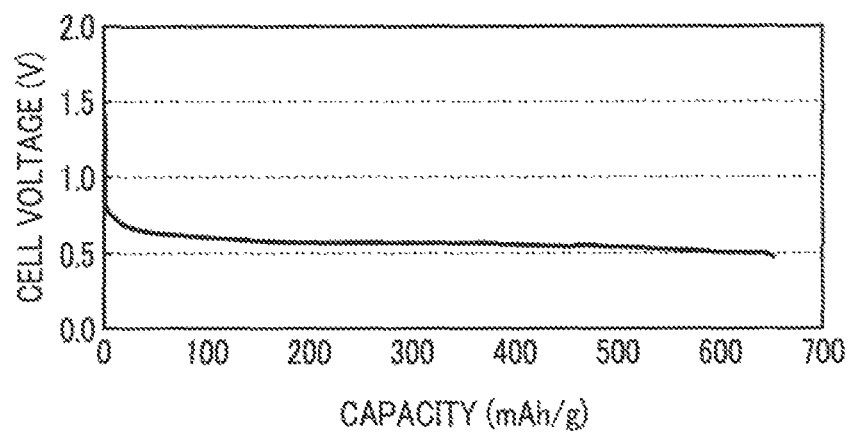
[FIG. 10] A graph showing the discharge capacity of the metal air battery of Example 4 of the present invention.

Next, the metal air battery 1 obtained in the present Example was loaded on an electrochemical measuring apparatus (made by Toho Technical Research Co., Ltd.); and a current of 0.1 mA/cm$^2$ was applied between the negative electrode 2 and the positive electrode 3, and the discharge was carried out until the cell voltage became 0.5 V. relationship between the cell voltage and the capacity is shown in FIG. 10.

Example 5

In the present Example, a metal air battery 1 equipped with the configuration shown n FIG. 2 was formed as is explained below.

First, the composite oxide represented by the chemical formula $YMnO_3$ was prepared as the oxygen-storing material wholly the same as in Example 1. It was confirmed that the composite oxide obtained in the present Example was the composite oxide represented by the chemical formula $YMnO_3$, and have a hexagonal structure.

Then, 10 parts by mass of the composite oxide obtained in the present Example, 80 parts by mass of Ketjen Black (made by Lion Corp.), and 10 parts by mass of a PTFE (made by Daikin Industries, Ltd.) as a binder were mixed to thereby obtain a positive electrode mixture. Then, the Obtained positive electrode mixture was press bonded at a pressure of 5 MPa on a positive electrode current collector 7 composed of a Ni porous body to thereby form a positive electrode 3. The Ni porous body has 0.45 mm in pore diameter and 8000 m$^2$/m$^3$ of specific surface.

Figure 11:
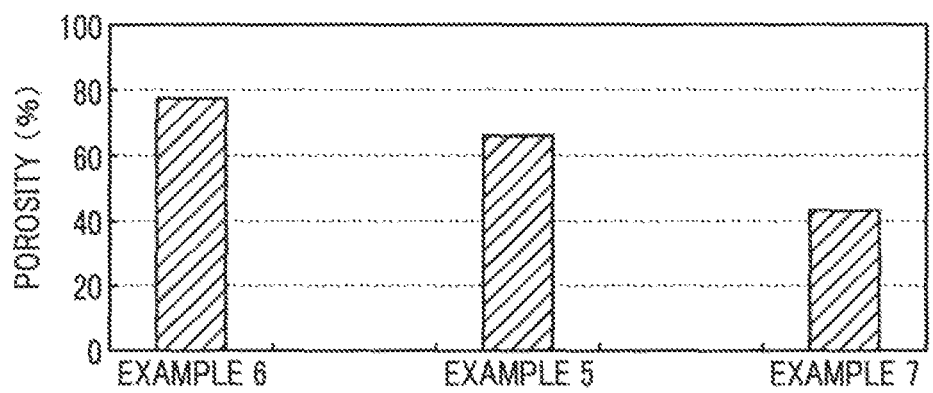
[FIG. 11] A graph showing the porosity of the positive electrode mixture used in the metal air battery of the second aspect of the present invention.

Then, the porosity of the mixture was measured by the mercury intrusion method using a fully automatic pore distribution measuring apparatus (made by Quantachrome Corp.). The result is shown in FIG. 11. From FIG. 11, it is clear that the positive electrode mixture of the present Example had a porosity of 66% by volume.

Then, via a negative electrode current collector 5 of 15 mm in diameter composed of a Ni mesh body, a negative electrode 2 of 15 mm in diameter and 1 mm thickness composed of metal Li was arranged inside a bottomed cylindrical stainless steel-made negative electrode container 6 of 15 mm in inner diameter.

Then, a separator 4 composed of a glass filter paper (made by Advantec Toyo Kaisha, Ltd., product name: GA200) of 15 mm in diameter was placed on the negative electrode 2. Then, the positive electrode 3 and the positive electrode current collector 7 were placed on the separator 4 so that the positive electrode 3 contacted with the separator 4.

Then, an electrolyte was injected into the separator 4. The electrolyte was a solution (made by Kishida Chemical Co., Ltd.) in which lithium hexafluorophosphate ($LiPF_6$) as a supporting salt was dissolved in a concentration of 1 mol/L in a solvent Which was a mixed solution prepared by mixing 50 parts by mass of ethylene carbonate and 50 parts by mass of diethyl carbonate.

Then, the positive electrode 3 and the positive electrode current collector 7 were closed by a positive electrode container 8 made of stainless steel to thereby obtain a metal air battery 1 equipped with the configuration shown in FIG. 2.

In the metal air battery 1 shown in FIG. 2, the positive electrode container 8 is a bottomed cylindrical body equipped with a hole 10 at the inner peripheral side thereof, and is equipped with a plurality of cylindrical air pools 11 communicating with the bottom of the hole 10. The positive electrode 3, the positive electrode current collector 7, and a pressure member 12 are accommodated in the hole 10. The pressure member 12 is equipped with a plurality of penetrating holes 13 communicating with the air pool 11 at the inner peripheral side thereof.

Further, in the metal air battery 1, the positive electrode container 8 and the negative electrode container 6 are electrically insulated by an insulating resin member 9 arranged around the separator 4. The insulating resin member 9 is a ring shape of 32 mm in outer diameter, 30 mm in inner diameter and 5 mm in thickness composed of a PTFE.

Figure 12:
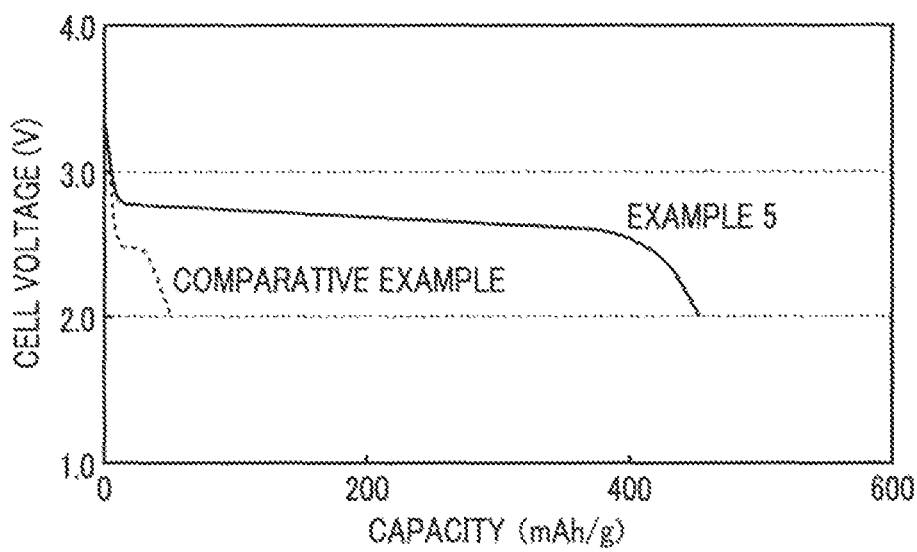
[FIG. 12] A graph showing the discharge capacity and the charge capacity of the metal air battery of Example 5 of the present invention.
Figure 12:
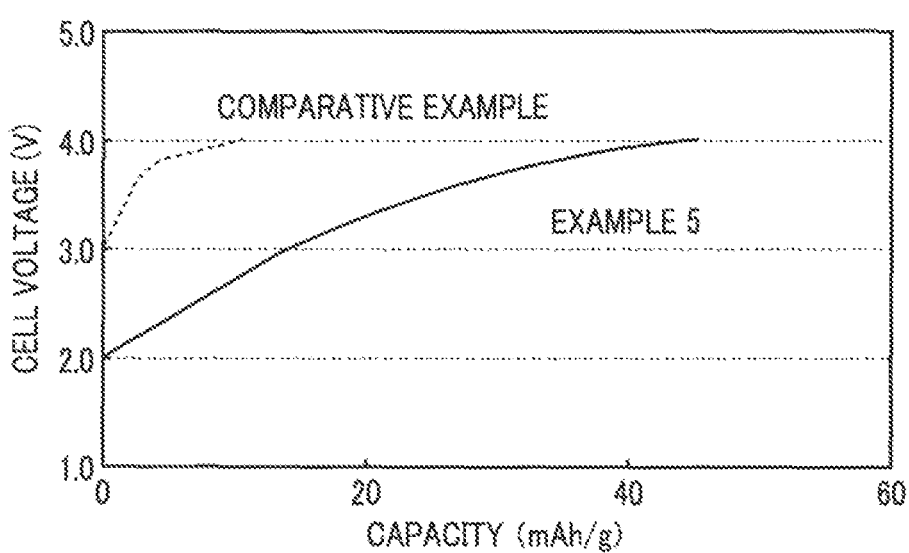

Then, the metal air battery 1 obtained in the present Example was loaded on an electrochemical measuring apparatus (made by Solartron Group, product name: SI1287); and a current of 0.1 $mA/cm^2$ was applied between the negative electrode 2 and the positive electrode 3, and the discharge was carried out until the cell voltage became 2.0 V. The relationship between the cell voltage and the capacity is shown in FIG. 12(a).

Then, the metal air battery 1 obtained in the present Example was loaded on the electrochemical measuring apparatus (made by Solartron Group, product name: SI1287); and a current of 0.1 $mA/cm^2$ was applied between the negative electrode 2 and the positive electrode 3, and the charge was carried out until the cell voltage became 4.0 V. The relationship between the cell voltage and the capacity is shown in FIG. 12(b).

Comparative Example

In the present Comparative Example, a metal air battery 1 equipped with a configuration shown in FIG. 2 was obtained wholly the same as in Example 5, except for using a manganese dioxide in place of the oxygen-storing material in Example 5.

Then, the discharge performance and the charge performance of the metal air battery 1 obtained in the present Comparative Example were measured wholly the same as in Example 5, except for using the metal air battery 1 obtained in the present Comparative Example. The measurement result of the discharge performance is shown in FIG. 12(a), and the measurement result of the charge performance is shown in FIG. 12(b).

From FIG. 12(a) and FIG. 12(b), it is apparent that the metal air battery 1 of Example 5 according to the present invention may obtain larger charge-discharge capacity, compared to the conventional metal air battery using manganese dioxide as the positive electrode 3.

Example 6

In the present Example, the positive electrode 3 was obtained wholly the same as its Example 5, except that a pressure of 1 MPa was applied when press bonding the positive electrode mixture comprising the composite oxide obtained in Example 5, carbon black, and PTFE, on the positive current collector 7 composed of a Ni porous body. Then, the porosity of the positive electrode mixture was measured wholly the same as in Example 5, except that the positive electrode 3 obtained in the present Example was used. The result is shown in FIG. 11. From FIG. 11, it is apparent that the porosity of the positive electrode mixture of the present Example is 78% by volume.

Then, the metal air battery 1 was obtained wholly the same as in Example 5, except that the positive electrode 3 obtained in the present Example was used.

Figure 13:
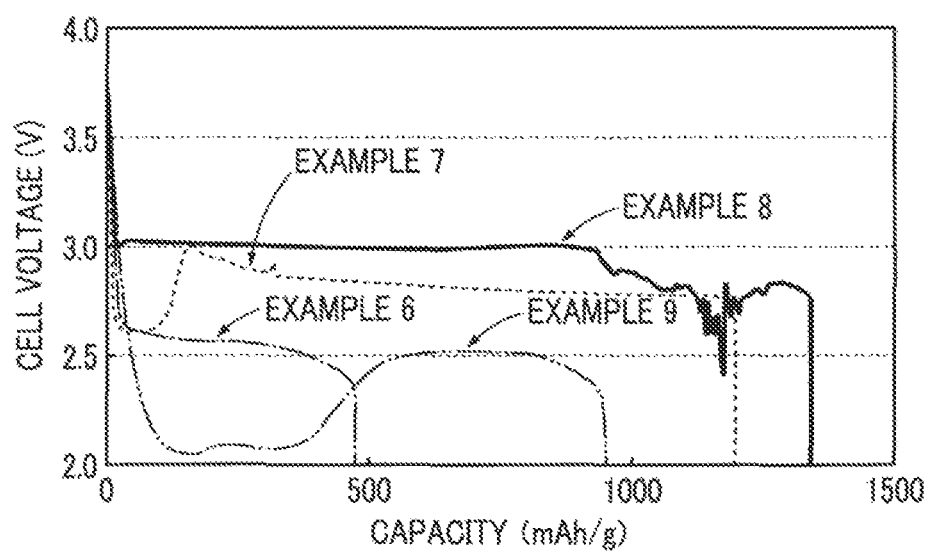
[FIG. 13] A graph showing the discharge capacity of the metal air battery of Examples 6 to 9 of the present invention.

Then, the discharge performance of the metal air battery 1 obtained in the present Example was measured wholly the same as in Example 5, except that the metal air battery 1 obtained in the present Example was used. The result is shown in FIG. 13.

Example 7

In the present Example, the positive electrode 3 was obtained wholly the same as in Example 5, except that a pressure of 10 MPa was applied When press bonding the positive electrode mixture comprising the composite oxide obtained in Example 5, carbon black, and PTFE, on the positive current collector 7 composed of a Ni porous body. Then, the porosity of the positive electrode mixture was measured wholly the same as in Example 5, except that the positive electrode 3 obtained in the present Example was used. The result is shown in FIG. 11.

From FIG. 11, it is apparent that the porosity of the positive electrode mixture of the present Example is 44% by volume. Further, from FIG. 11, it is apparent that the porosity of the positive electrode mixture may be adjusted in the range of 40 to 80% by volume, by setting the pressure in the range of 1 to 10 MPa when press bonding the positive electrode mixture on the positive current collector 7 composed of the Ni porous body.

Then, the metal air battery 1 was obtained wholly the same as in Example 5, except that the positive electrode 3 obtained in the present Example was used.

Then, the discharge performance of the metal air battery 1 was measured wholly the same as in Example 5, except that the metal air battery 1 obtained in the present Example was used. The result is shown in FIG. 13.

Example 8

In the present Example, the metal air battery 1 was obtained wholly the same as in Example 5, except that a gas including 90% by volume of oxygen and the remainder of $N_2$ was injected in place of air into the air pool 11.

Then, the discharge performance of the metal air battery 1 was measured Wholly the same as in Example 5, except that the metal air battery 1 obtained in the present Example was used. The result is shown in FIG. 13.

Example 9

In the present Example, the metal air battery 1 was obtained wholly the same as in Example 5, except that a positive electrode mixture was obtained by mixing 90 parts by mass of the composite oxide obtained in Example 5, 5 parts by mass of Ketjen Black (made by Lion Corp.), and 5 parts by mass of a PTFE. (made by Daikin Industries, Ltd.).

Then, the discharge performance of the metal air battery 1 was measured wholly the same as in Example 5, except that the metal air battery 1 obtained in the present Example was used. The result is shown in FIG. 13.

From FIG. 13, according to the metal air battery 1 of Example 6 and Example 7, in which the porosity of the mixture was adjusted in the range of 40 to 80% by volume, it is apparent that equivalent charge-discharge capacity as in the metal air battery 1 of Example 5 may be obtained. Further, according to the metal air battery 1 of Example 8 using gas including 90% by volume of oxygen and the remainder of $N_2$ in place of air, it is apparent that stable cell voltage and superior discharge capacity may be obtained. Further, according to the metal air battery 1 of Example 9 in which the content of the oxygen-storing material in the positive electrode mixture is increased than in Example 5, it is apparent that a discharge capacity in the interim of Examples 5-7 and Example 5 may be obtained.

REFERENCE SIGNS LIST

1; metal air battery, 2: negative electrode, 3; positive electrode, 4: separator immersed with electrolysis.

The invention claimed is:

1. A metal air battery, comprising:
   a negative electrode comprising one metal selected from a group consisting of Li, Zn, Mg, Al, and Fe;
   a positive electrode comprising a mixture of a carbon material and an oxygen-storing material which stores an oxygen-containing species; and
   an electrolyte interposed between the negative electrode and the positive electrode;
   wherein the oxygen-containing species comprises a composite oxide of yttrium and manganese represented by $YMnO_3$, and has an hexagonal structure.

2. The metal air battery according to claim 1, wherein the negative electrode comprises one metal selected from a group consisting of metal Li, Zn, and Fe.

3. The metal air battery according to claim 1, wherein the negative electrode comprises metal Li.

4. The metal air battery according to claim 1, wherein the oxygen-containing species stored on a surface of the mixture comprises at least one molecule or anion selected from a group consisting of $O_2$, $O^{2-}$, CO, $CO_2$, $CO_3^{2-}$, $HCO_3^-$, and $CH_3COO^-$.

5. The metal air battery according to claim 1, wherein the positive electrode comprises a mixture of the carbon material and the oxygen-storing material, and a binder.

6. The metal air battery according to claim 1, wherein the oxygen-storing material has an average particle diameter of 50μm or less, is supported on the carbon material, and has a mass in a range of 10 to 90% by mass with respect to a total mass of the positive electrode.

7. The metal air battery according to claim 1, wherein the mixture has a porosity in a range of 10 to 90% by volume.

8. The metal air battery according to claim 7, wherein the mixture has the porosity in a range of 40 to 80% by volume.

* * * * *